(12) United States Patent
Tan et al.

(10) Patent No.: US 7,370,118 B2
(45) Date of Patent: May 6, 2008

(54) METHODS, SYSTEMS, AND COMPUTER PROGRAM PRODUCTS FOR DYNAMIC INTER-OPERABILITY OF NODES IN SERVICE GRIDS

(75) Inventors: Yih-Shin Tan, Raleigh, NC (US); Vivekanand Vellanki, Raleigh, NC (US); Jie Xing, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 10/771,911

(22) Filed: Feb. 4, 2004

(65) Prior Publication Data

US 2005/0188104 A1 Aug. 25, 2005

(51) Int. Cl.
G06F 15/173 (2006.01)
(52) U.S. Cl. ..................................... 709/238
(58) Field of Classification Search ................ 709/238, 709/248, 223
See application file for complete search history.

(56) References Cited

U.S. PATENT DOCUMENTS

| 6,782,003 | B1 * | 8/2004 | Giroux et al. | 370/466 |
| 7,171,470 | B2 * | 1/2007 | Doyle et al. | 709/225 |
| 2003/0120596 | A1 | 6/2003 | Sharp | 705/40 |

OTHER PUBLICATIONS

Aversa et al., "Load Balancing a Cluster of Web Servers Using Distributed Packet Rewriting," *Computer Science Department, Boston University* pp. 1-7, no date.
Bramley et al., "A Component Based Services Architecture for Building Distributed Applications," *IEEE* No. 1082-8907/00, 51-58 (2000).
Chang et al., "BPM/2/: A Grid-Based Architectural Framework for Business Process Meta Management," RC-22590 Abstract (Oct. 2002).
Chen et al., "A Web-Services-Based Deployment Framework in Grid Computing Environment," RC-22470 Abstract (May 2002).
Düllmann et al., "Models for Replica Synchronization and Consistency in a Data Grid," *IEEE* No. 0-7695-1296-8/01 67-75 (2001).
Foster et al., he Physiology Grid An Open Grid Services Architecture for Distributed Systems Integration, (draft) http://globus.org/research/papers/ogsa.pdf, no date.
Gannon et al., "A Revised nalysis of the Open Grid Services Infrastructure," *Computing and Informatics* 21 321-332 (2002).
Talia, Domenica, "The Open Grid Services Architecture: Where the Grid Meets the Web," *IEEE Internet Computing* IEEE No. 1089-7801/02 67-71 (Nov.-Dec. 2002).

* cited by examiner

*Primary Examiner*—David Y. Eng
(74) *Attorney, Agent, or Firm*—Joseph Bracken; Myers Bigel Sibley & Sajovec, P.A.

(57) ABSTRACT

Dynamic inter-operability of nodes in services grids can be provided. In some cases, different version service nodes in a service grid can communicate using an inter-operability service to, for example, convert messages from one format associated with a version of a service node to another format associated with another version of a service node. Also, the message format may be converted from a current (e.g., newer) version of a node to another format which is compatible with an older version of a service node. The inter-operability service can be provided as a web service that is separate from the service nodes in the grid. The inter-operability service is associated with at least one of the service nodes in the grid and is available thereto via, for example, an administrative call by the associated service node.

10 Claims, 10 Drawing Sheets

| 105 | 1 | 105, 115, 125 |
| 115 | 2 | 105, 115, 130 |
| 125 | 3 | 105, 125, 130 |
| 130 | 4 | 115, 125, 130 |

Inter-operability service table — 220

Fig. 2

Inter-operability service table 600

| 505 | 4 | 515, 525 |
|-----|---|----------|
| 515 | 3 | 505, 525, 530 |
| 525 | 2 | 505, 515, 530, 525a, 525b |
| 530 | 1 | 515, 525 |

METHODS, SYSTEMS, AND COMPUTER PROGRAM PRODUCTS FOR DYNAMIC INTER-OPERABILITY OF NODES IN SERVICE GRIDS

FIELD OF THE INVENTION

The invention generally relates to the field of information processing and, more particularly, to processing requests for service between nodes in a service grid.

BACKGROUND

Computing devices, referred to herein sometimes as service nodes, can be coupled together in a network, such as the Internet, to define what is commonly referred to as a service grid. A service grid can be established to provide access to the group of computing services via a common services entry point. In operation, a conventional service grid can match a service associated with a service node to a service request responsive to a request for that service.

Even though the different service nodes in the grid may provide similar services, there may exist differences in the way in which particular service nodes communicate with other service nodes. For example, newer version service nodes introduced into the grid may include increased functionality which is unknown to older version service nodes. Therefore, the older version service nodes may be unable to communicate with the newer version service nodes and vice-versa. A conventional approach to this type of communication problem is to require each node to include the ability to convert communications between any of the versions in the grid. This approach may become intractable as the number of service nodes and number of existing versions in the grid increases.

SUMMARY

Embodiments according to the invention can provide methods, systems, and computer program products for dynamic inter-operability of nodes in services grids. In some embodiments according to the invention, different version service nodes in a service grid can communicate using an inter-operability service to, for example, convert messages from one format associated with a version of a service node to another format associated with another version of a service node. Also, in some embodiments according to the invention, the message format may be converted from a current (e.g., newer) version of a node to another format which is compatible with an older version of a service node. In some embodiments according to the invention, the inter-operability service can be provided as a web service that is separate from the service nodes in the grid. In some embodiments according to the invention, the inter-operability service is associated with at least one of the service nodes in the grid and is available thereto via, for example, an administrative call by the associated service node.

In some embodiments according to the invention, the inter-operability service can include an inter-operability service table which includes version information about the respective service node as well as information as to which versions of service nodes the current service node can communicate with. For example, in some embodiments according to the invention, the inter-operability service table can indicate that a particular service node has an associated service node version and which other service node versions the particular service node is capable of communicating with. Moreover, the inter-operability service table can include information related to a large number of service nodes in the grid, which can be used to convert between message formats associated with different version service nodes.

Furthermore, in some embodiments according to the invention, the inter-operability service table can be used to "daisy chain" a message from an originating service node to a destination service node through an intermediate service node where the intermediate service node is able to communicate with the version of the originating service node and the version of the destination service node. In still other embodiments according to the invention, the inter-operability service can update the version associated with existing service nodes as service nodes are upgraded. Furthermore, the inter-operability service can incorporate version information regarding new service nodes that are added to the grid.

In some embodiments according to the invention, a requesting service node message is transmitted from a requesting service node in a service grid directed to a destination service node in the service grid, the requesting service node message having a requesting service node message format associated with a version of the requesting service node. The requesting service node message is received at an inter-operability Web service that is separate from the requesting service node in the requesting service node message format. A destination service node message format is determined for the requesting service node message based on a version of the destination service node.

In some embodiments according to the invention, a requesting service node message is transmitted from a requesting service node in a service grid directed to a destination service node in the service grid, the requesting service node message having a requesting service node message format associated with a version of the requesting service node. The requesting service node message is received at an inter-operability service in the requesting service node message format. A version of the destination service node determined and the version of the destination service node is updated at the inter-operability service based on the determined version of the destination service node.

In some embodiments according to the invention, a version of a destination service node is determined to be unknown at a first inter-operability service associated with a requesting service node having a version of the requesting service node in a service grid. The version of the requesting service node and the version of the destination service node are determined to be known at a second inter-operability service associated with an intermediate service node available to the requesting service node. A requesting service node message is transmitted from the requesting service node directed to the destination service node in a requesting service node message format associated with the version of the requesting service node via the second inter-operability service.

Analogous system and computer program product embodiments are also within the scope of the claims.

BRIEF DESCRIPTION OF THE DRAWINGS

FIG. 2 is a schematic drawing that illustrates embodiments of inter-operability service tables according to the invention.

FIG. 6 is a schematic diagram that illustrates embodiments of interoperability service tables according to the invention.

DESCRIPTION OF EMBODIMENTS ACCORDING TO THE INVENTION

Figure 1:
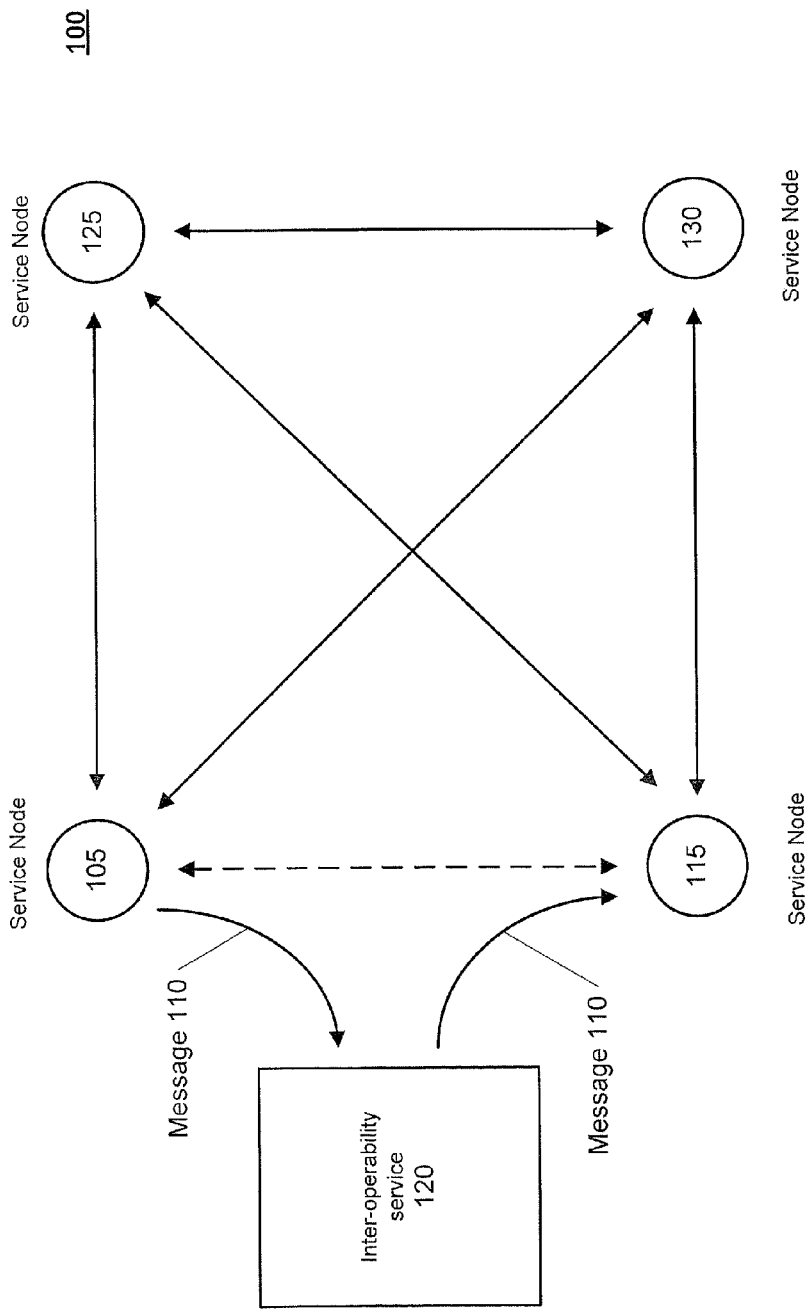
FIG. 1 is a schematic diagram that illustrates embodiments of inter-operability services according to the invention.

The invention is described herein with reference to the accompanying drawings, in which embodiments of the invention are shown. This invention may, however, be embodied in many different forms and should not be construed as limited to the embodiments set forth herein; rather; these embodiments are provided so that this disclosure will be thorough and complete, and will fully convey the scope of the invention to those skilled in the art. Like numbers and reference designators refer to like elements throughout.

As will be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code or "code" for carrying out operations according to the present invention may be written in an object oriented programming language such as JAVA®, or in various other programming languages. Software embodiments of the present invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

The invention is described below with reference to diagram illustrations of methods, systems and computer program products according to embodiments of the invention. It is understood that each element shown in the diagrams (i.e., flow diagrams), and combinations of elements in the diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the diagram element or elements.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the diagram element or elements.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the diagram block or blocks.

As used herein, the term "Web services" includes any mechanism by which an application service may be provided to other applications on the Internet. Web services may be informational or transactional. That is, some services provide information of interest to the requester while other services may actually lead to the invocation of business processes. Examples of publicly available Web services today include stock quote services, services to retrieve news from Web news sources, and currency conversion services.

It will be understood that some Web services are modular, and related Web services can be aggregated into a larger Web service. For example, in some environments, a wireless application can include separate Web services that obtain stock quotes, subscribe to news services, convert currency, manage calendars, and the like. Web services can provide a level of abstraction which may allow an existing enterprise application to be provided as a Web service.

Web services provide a way to make key business processes accessible to customers, partners, and suppliers. For example, an airline could provide its airline reservation systems as a Web service to make it easier for its large corporate customers to integrate the service into their travel planning applications. A supplier can make its inventory levels and pricing accessible to its key buyers. This emerging technology enables e-business applications to be connected more easily both inside and outside the enterprise.

Web services are based on the eXtensible Markup Language (XML) standard data format and data exchange mechanisms, which provide both flexibility and platform independence. With Web services, requesters may not know about the underlying implementation of Web services. One example of Web services are the services responsive to Simple Object Access Protocol (SOAP) formatted messages. It will be understood that SOAP is an application invocation protocol developed by IBM, Microsoft, and others that defines a simple protocol for exchanging information encoded as XML messages. SOAP is described in greater detail, for example, in the working draft of version 1.2, available at http://www.w3.org/2000/xp/, which is incorporated by reference herein.

These services are sometime described by WSDL (Web Service Description Language) notation stored in WSDL documents. WSDL is described in the Web Services Description Language 1.1 document, available at http:// www.w3.org/TR/wsdl, which is incorporated by reference herein. A WSDL document may be stored in numerous ways; in a file, in a DB2 XML Registry/Repository (such as the DB2 XRR(XML Registry/Repository)), or in a DB2 based UDDI Registry, for example. UDDI (Universal Description, Discovery, Integration) is a protocol for describing Web services such that interested parties may easily discover them. Specifications for this registry and use of WSDL in the registry are available currently at http://www.uddi.org/. Service providers may register their services in a UDDI, specifying technical information about how to invoke the service. IBM operates a publicly available UDDI service using DB2 and WebSphere. Web services are described further, for example, in Pre-Grant Publication Document Number 20030093436, published May 15, 2003, the disclosure of which is incorporated herein by reference.

Embodiments according to the invention can provide methods, systems, and computer program products for dynamic inter-operability of nodes in services grids. In some embodiments according to the invention, different version service nodes in a service grid can communicate using an inter-operability service to, for example, convert messages from one format associated with a version of a service node to another format associated with another version of a service node. Also, in some embodiments according to the invention, the message format may be converted from a current (e.g., newer) version of a node to another format which is compatible with an older version of a service node. In some embodiments according to the invention, the inter-operability service can be provided as a web service that is separate from the service nodes in the grid. In some embodiments according to the invention, the inter-operability service is associated with at least one of the service nodes in the grid and is available thereto via, for example, an administrative call by the associated service node.

In some embodiments according to the invention, the inter-operability service can include an inter-operability service table which includes version information about the respective service node as well as information as to which versions of service nodes the current service node can communicate with. For example, in some embodiments according to the invention, the inter-operability service table can indicate that a particular service node has an associated service node version and which other service node versions the particular service node is capable of communicating with. Moreover, the inter-operability service table can include information related to a large number of service nodes in the grid, which can be used to convert between message formats associated with different version service nodes. Furthermore, in some embodiments according to the invention, the inter-operability service table can be used to "daisy chain" a message from an originating service node to a destination service node through an intermediate service node where the intermediate service node is able to communicate with the version of the originating service node and the version of the destination service node. In still other embodiments according to the invention, the inter-operability service can update the version associated with existing service nodes as service nodes are upgraded. Furthermore, the inter-operability service can incorporate version information regarding new service nodes that are added to the grid.

FIG. 1 is a schematic diagram that illustrates embodiments of inter-operability services according to the invention. In particular, a service grid 100 includes first through fourth service nodes 105, 115, 125, and 130. It will be understood that each of the service nodes has an associated version which can indicate functionality or services offered by the service nodes as well as a respective format for messages through which the service node can communicate with other service nodes.

It will be understood that, as used herein, the term "message" can include information, such as, typically used included in communications used in Web services known to those skilled in the art. For example, a "message" can include administrative information related to requesting services node, intermediate service nodes, destinations service nodes, and other types of nodes and information used to provide services in a Web service environment. A "message" can also include information related to an action to be taken or a service to be provided, sometimes referred to in Web services known to those skilled in the art, as a "verb". Accordingly, the messages disclosed herein can include Webs service message and verb information.

It will be understood that versions of service nodes according to the invention may be capable of communicating with multiple other versions of service nodes. For example, in some embodiments according to the invention, the service node 105 may be a version service node which is capable of communicating with previous version service nodes as well as later version service nodes. It will be understood that versions of service nodes according to the invention may, however, be unable to communicate with some other version service nodes due to, for example, a large number of legacy (i.e., pre-existing) version service nodes deployed in the service grid 100. Each of the service nodes 105-130 can transmit and receive messages in respective formats associated with the version of the respective service node. For example, according to FIG. 1, the service node 105 can transmit and receive messages to/from any of the other service nodes in the grid 100.

In some embodiments according to the invention, messages are transmitted between service nodes in the service grid 100 via an inter-operability service 120. As discussed briefly above, the inter-operability service 120 can provide a conversion from one message type associated with a first version service node to a second message type associated with a second version service node. For example, as shown in FIG. 1, if the service node 105 (i.e., a requesting service node) requests service from the service node 115 (i.e., the destination service node), the service node 105 transmits a requesting service node message 110 (directed to the second service node 115) in a format that is associated with the version of service node 105.

It will be understood that the requesting service node message 110 is received by the inter-operability service 120 which determines whether the requesting service node message format is known (i.e., can be converted to a message format associated with the version of the destination service node). If the inter-operability service 120 determines that a conversion is possible, the inter-operability service 120 can, in some embodiments according to the invention, convert the message format used by the version of the service node 105 to the message format used by the version of the second service node 115 to provide the requesting service node message in the destination service node message format which is transmitted to the second service node 115 (i.e., the destination service node). Accordingly, the requesting service node and the destination service node may be relieved from maintaining version information for the other service nodes and, moreover, may not need to perform the conversion from one version message format to another. Instead, in some embodiments according to the invention, the version information for the respective service nodes can be maintained by the inter-operability service.

It will be understood that although FIG. 1 illustrates only four service nodes in the service grid 100, more or fewer service nodes can be included in the service grid 100. It will also be understood that although the inter-operability service 120 is shown as a service that is separate from and available to the service nodes in the service grid 100, such as via a web service, the inter-operability service 120 may be provided as a local function to each, or selected ones, of the service nodes in the service grid 100.

FIG. 2 is a schematic diagram that illustrates embodiments of inter-operability service tables according to the invention. In particular, an inter-operability service table 220 can store information related to each of the service nodes 105-130 shown in FIG. 1. The inter-operability service table 220 can include information indicating the version of each of the respective service nodes stored therein. For example, inter-operability service table 220 shows that the service node 105 is a version 4 service node whereas service nodes 115-130 are version 3, 2, and 1 service nodes respectively. Furthermore, in some embodiments according to the invention, the inter-operability service table 220 can include information indicating each of the other service nodes in the service grid 100 with which the respective service node can communicate. The information indicating which other service nodes the respective service node can communicate with can be used by the inter-operability's service to convert messages from one format to another. For example, the entry in the inter-operability service table 220 associated with the service node 105 shows that the inter-operability service is capable of converting messages from version 4 service nodes (i.e. the first service node 105) to version 3, 2, and 1 service nodes (i.e., the versions associated with all of the other service nodes shown in FIG. 1). Accordingly, the inter-operability service can convert messages formatted according to a version 4 service node to a version 3, 2, and/or 1 version service node message.

Each of the other entries in the inter-operability service table 220 associated with the other service nodes shows that the inter-operability service can convert messages formatted according to the respective version of the service nodes to each of the other versions of service nodes in the service grid 100. It will be understood that the conversion between message formats supported by different versions of service nodes can be provided as part of the inter-operability service or, alternatively, may be provided as a separate service that is available to the inter-operability service according to the invention.

Figure 3:
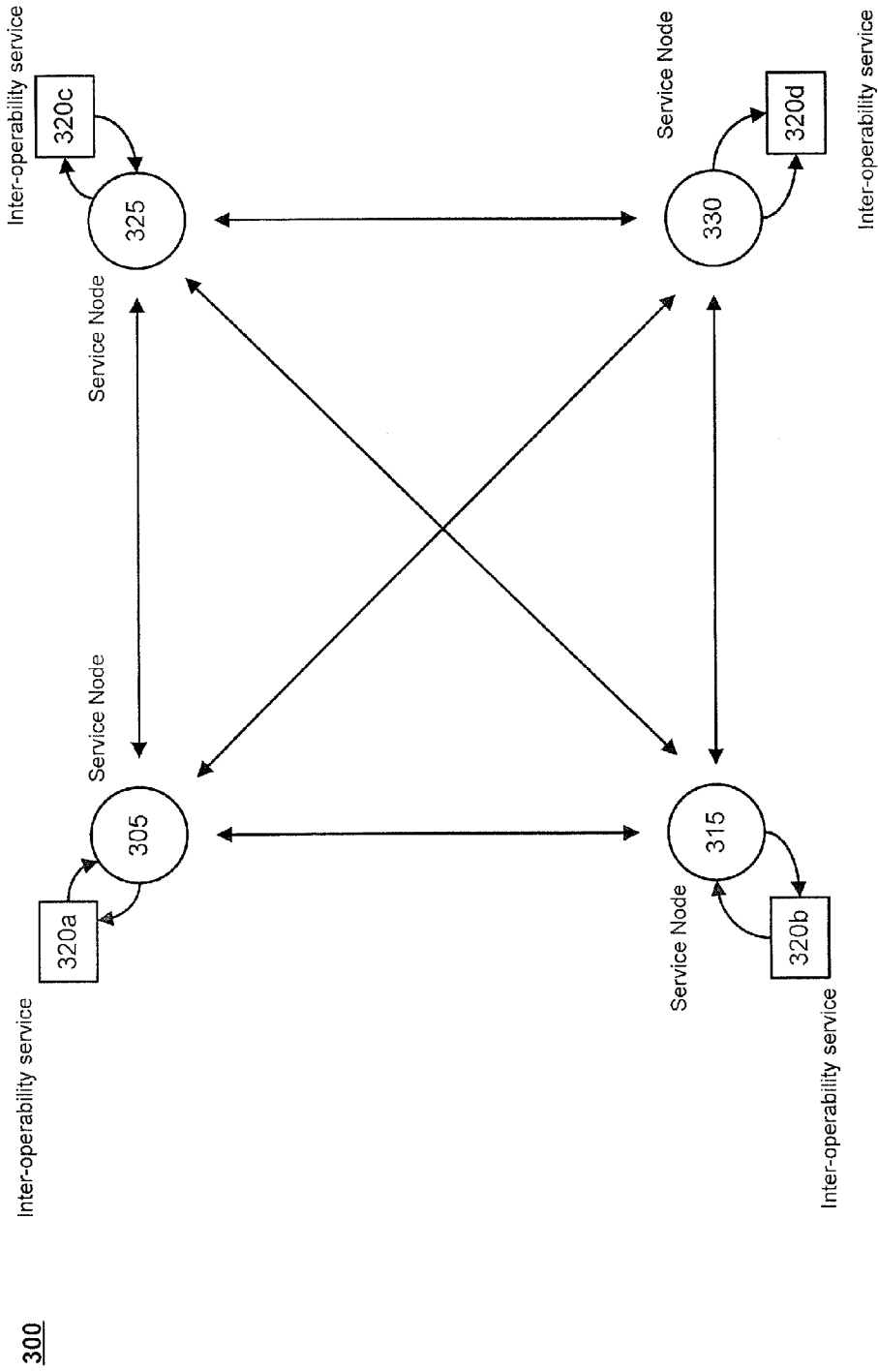
FIG. 3 is a schematic diagram that illustrates embodiments of local inter-operability service tables according to the invention.

FIG. 3 is a schematic diagram that illustrates embodiments of inter-operability services according to the invention. In particular, FIG. 3 shows that each of the service nodes 305-330 has an associated inter-operability service which is available for use in communicating with other version service nodes in service grid 300. For example, the service node 305 has an associated inter-operability service 320a associated therewith. Accordingly, the service node 305 can transmit messages to any of the service nodes in the grid 300 via the inter-operability service 320a. Similarly, the other service nodes 315-330 can transmit/receive messages to/from any of the other service nodes using respective inter-operability services 320b-d.

It will be understood that although FIG. 3 illustrates each of the service nodes 305-330 as having a dedicated local inter-operability service 320a-d associated therewith, in some embodiments according to the invention, fewer than all of the service nodes may have local inter-operability services associated therewith. Furthermore, in some embodiments according to the invention, inter-operability services can be provided using the local inter-operability services 320a-d shown in FIG. 3 as well as inter-operability services via a web service as discussed above in reference to FIG. 1. Furthermore, as discussed herein below in greater detail, inter-operability services can be provided by a service node in the grid rather than as a separate service that is associated with a service node or as a Web service.

Figure 4:
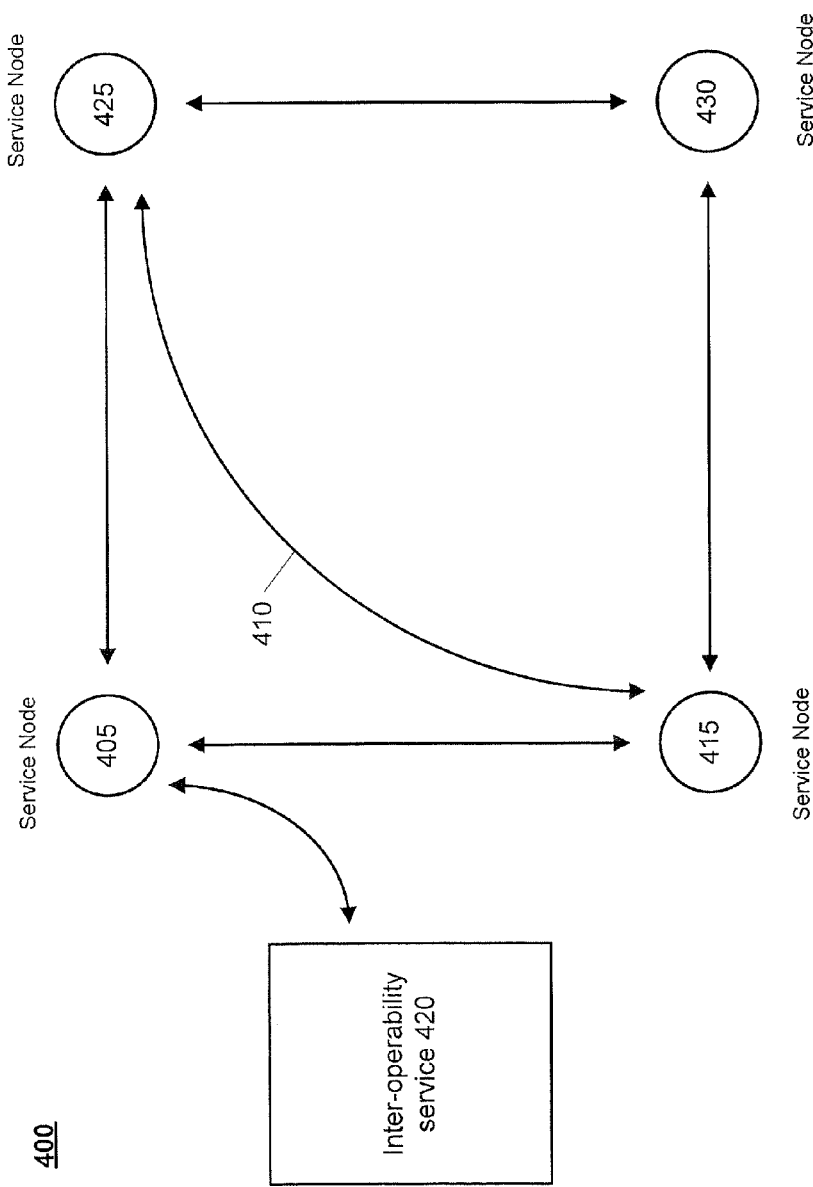
FIG. 4 is a schematic diagram that illustrates embodiments of inter-operability services and tables according to the invention.

FIG. 4 is a schematic diagram that illustrates embodiments of inter-operability services according to the invention. In particular, a service node 415 included in a service grid 400 provides inter-operability services to other service nodes in the grid 400. The inter-operability service node 405 includes an inter-operability service table 420 that stores version information as well as inter-operability information for each of the service nodes in service grid 400. For example, the inter-operability service table 420 stores information that indicates that a service node 415 is a version 2 service node whereas service nodes 425 and 430 are version 3 and 4 service nodes respectively. According to the inter-operability service table 420, the service node 415 (i.e. the version 2 service node) is unable to directly communicate with service node 425 (i.e. the version 3 service node) as service node 415 is unable to format messages according to those required by the service node 425. The service node 415 can transmit messages to the inter-operability service node 405 which in turn can convert the messages received from the service node 415 to a version 3 message format associated with the service node 425.

It will be further understood that although the inter-operability service shown in FIG. 4 is represented by an inter-operability service node, other types of inter-operability service can be provided in the grid 400. For example, in some embodiments according to the invention, inter-operability services can be provided by a web service and/or via local inter-operability services associated with service nodes in the grid 400 along with the inter-operability service node 405.

Figure 5:
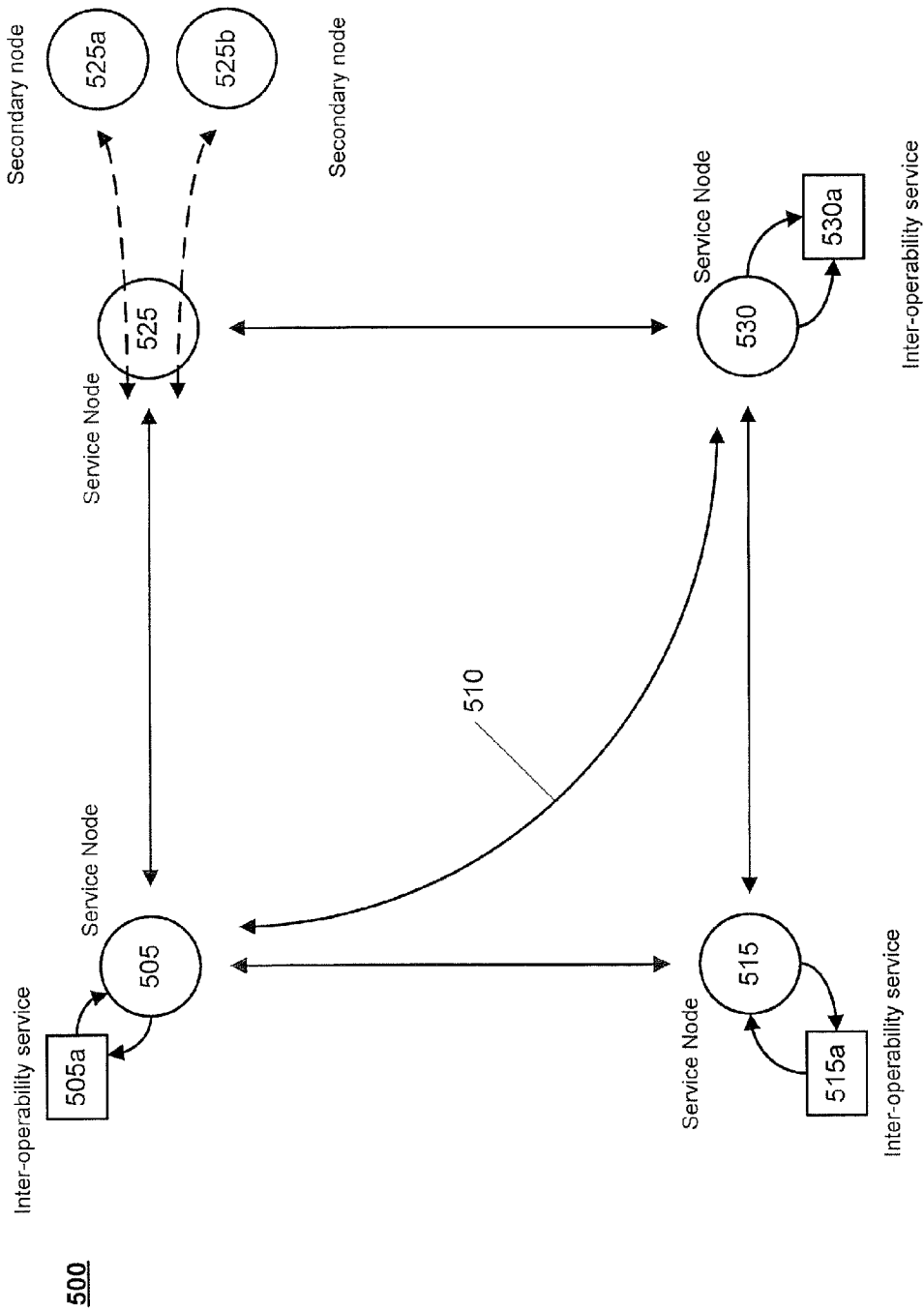
FIG. 5 is a schematic diagram that illustrates embodiments of inter-operability services according to the invention.

FIG. 5 is a schematic diagram that illustrates embodiments of inter-operability services according to the invention. According to FIG. 5, not all of the service nodes in service grid 500 are able to communicate directly with one another. In particular, a service node 505 is unable to directly communicate with a service node 530. For example, the service node 505 may be a later version service node whereas the service node 530 may be an earlier version service node which is unable to process messages according to the format used by the service node 505. As shown in FIG. 5, a service node 515 can act as an intermediate service node for messages directed from the service node 505 to the service node 530.

The intermediate service node 515 may be a version 3 service node which can communicate with version 4 service nodes as well as version 1 service nodes. Messages from the service node 505 formatted according to its respective version are received by the intermediate service node 515 and converted to a message format that is associated with the version of the service node 530. Accordingly, messages in the service grid 500 can be "daisy-chained" from one service node to another where each of the service nodes in a chain is able to communicate with the service nodes that are immediate neighbors in the chain. For example, in the example discussed above, the immediate neighbors of the intermediate service node 515 are the service node 505 and the service node 530.

In some embodiments according to the invention, the "daisy-chain" can be used to transmit messages directed to service nodes which are secondary to (i.e., operate under the control of) other service nodes. For example, as shown in FIG. 5, a message according to the version of the service node 505 can be transmitted to secondary nodes 525a-525b which operate under the control of a service node 525. In such embodiments according to the invention; the versions associated with the secondary nodes 525a-b may only be understood by the service node 525 such that all communications to the secondary service nodes 525a-b are directed through the service node 525.

FIG. 6 is a schematic diagram that illustrates embodiments of inter-operability service tables according to the invention. In particular, FIG. 6 illustrates an exemplary inter-operability service table 600 that supports "daisy-chaining" as described above. For example, the inter-operability service table 600 indicates that the service node 505 is a version 4 service node which is capable of communicating with service nodes 515 and 525 which are version 3 and version 2 service nodes respectively. Furthermore, the inter-operability service table 600 indicates that service node 530 is a version 1 service node which is capable of communicating with service nodes 515 and 525 which are version 3 and version 2 service nodes respectively. Accordingly, the service node 505 (i.e. the version 4 service node) is unable to communicate with a version 1 service node and service node 530 (i.e. version 1 service node) is unable to communicate with a version 4 service node. The inter-operability service table 600 further illustrates that although service nodes 505 and 530 are unable to communicate directly with one another, service node 515 (i.e. a version 3 service node) can communicate with service nodes 505 (a version 4 service node) and 525 (a version 1 service node). Therefore, the inter-operability service can be used to convert messages formatted according to one version of a service node to messages formatted according to a second version of a service node.

Figure 7:
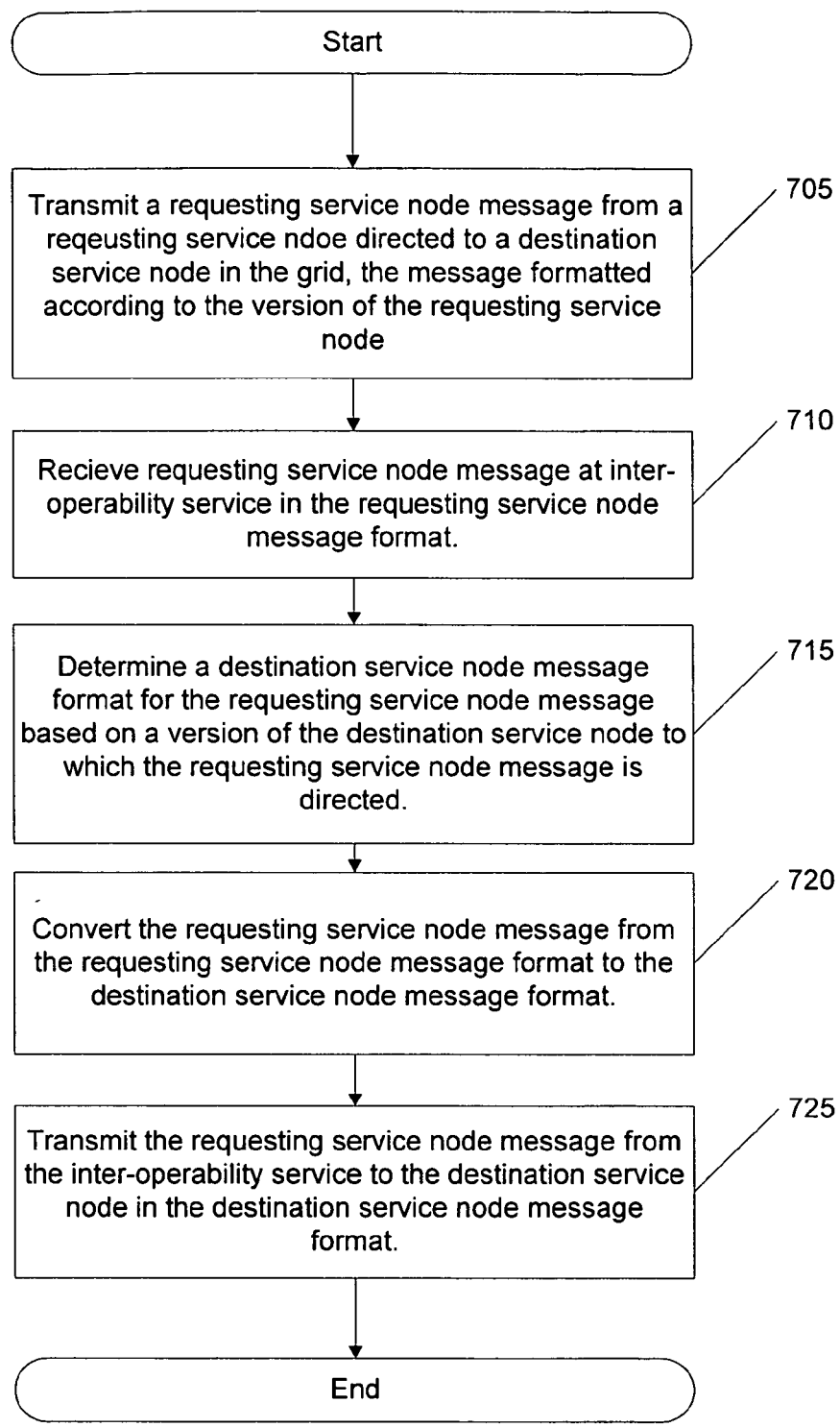
FIG. 7 is a flowchart that illustrates operations of embodiments of interoperability services according to the invention.

FIG. 7 is a flow chart that illustrates operations of embodiments of inter-operability services according to the invention. As shown in FIG. 7, a requesting service node transmits a requesting service node message that is directed to a destination service node in the grid. The requesting service node message is formatted according to the version of the requesting service node (Block 705). For example, if the requesting service node is a version 4 service node, the message transmitted by the requesting service node can be formatted as a version 4 service node message. It will be understood that different versions of service nodes may transmit and receive messages according to different formats depending on the particular version of the service node. For example, version 4 service nodes may format messages differently than version 3 service nodes.

The requesting service node message is received at an inter-operability service in the requesting service node message format (Block 710). It will be understood that the inter-operation service can be a web service that is accessible to the service grid or a local inter-operability service that is available to the transmitting service node by, for example, an administrative call, or a service node in the grid that functions as an inter-operability service. The inter-operability service can be provided by other means as well.

The inter-operation service determines a destination service node message format for the requesting service node message based on a version of the destination service node to which the requesting service node message is directed (Block 715). The inter-operability service can determine the format to be used to create the destination service node message by referring to the inter-operability service table. As disclosed above, the inter-operability service table can store the version of the destination service node. It will be understood that the inter-operability service can determine the version of the destination service node by, for example, transmitting a command to the destination service node that is configured to elicit a response indicating the version of the destination service node.

The inter-operability service converts the requesting service node message from the requesting service node message format to the destination service node message format (Block 720). In some embodiments according to the invention, the conversion of the requesting service node message to the destination service node message format can entail adding instructions or commands to those received as part of the requesting service node message or removing some of the instructions or commands included with the requesting service node message or changing some of the instructions and commands included with the requesting service node message.

The inter-operability service transmits the requesting service node message from the inter-operability service to the destination service node in the destination service node message format (Block 725). It will be understood that although the embodiments illustrated by FIG. 7 are described with reference to a message transmitted from a requesting service node to a destination service node via an inter-operability service, similar operations may be used when "daisy-chaining" messages from one inter-operability service to another in the service grid.

Figure 8A:
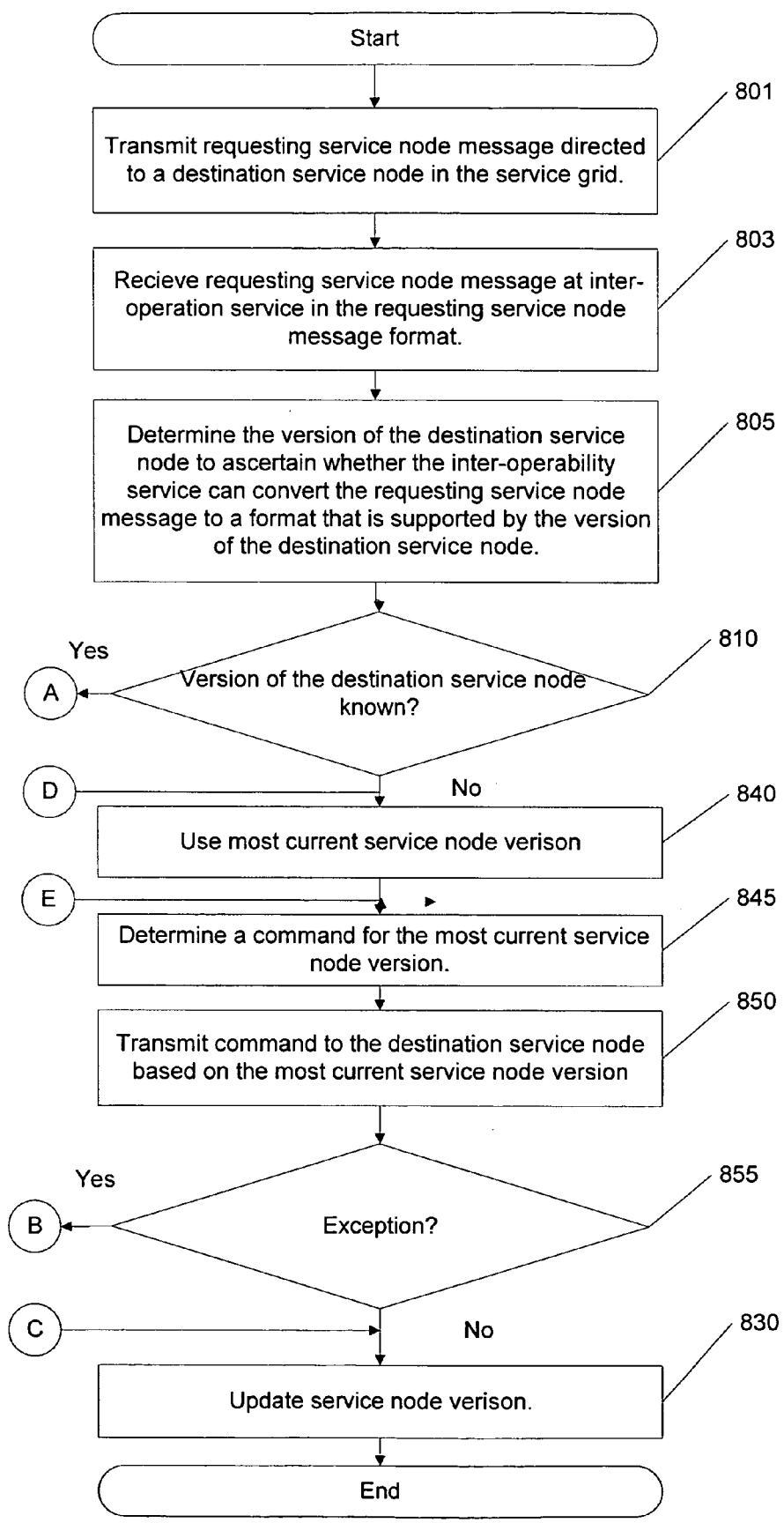
FIGS. 8A-8C are flowcharts that illustrate operations of embodiments of inter-operability services with dynamic version update capability according to the invention.
Figure 8B:
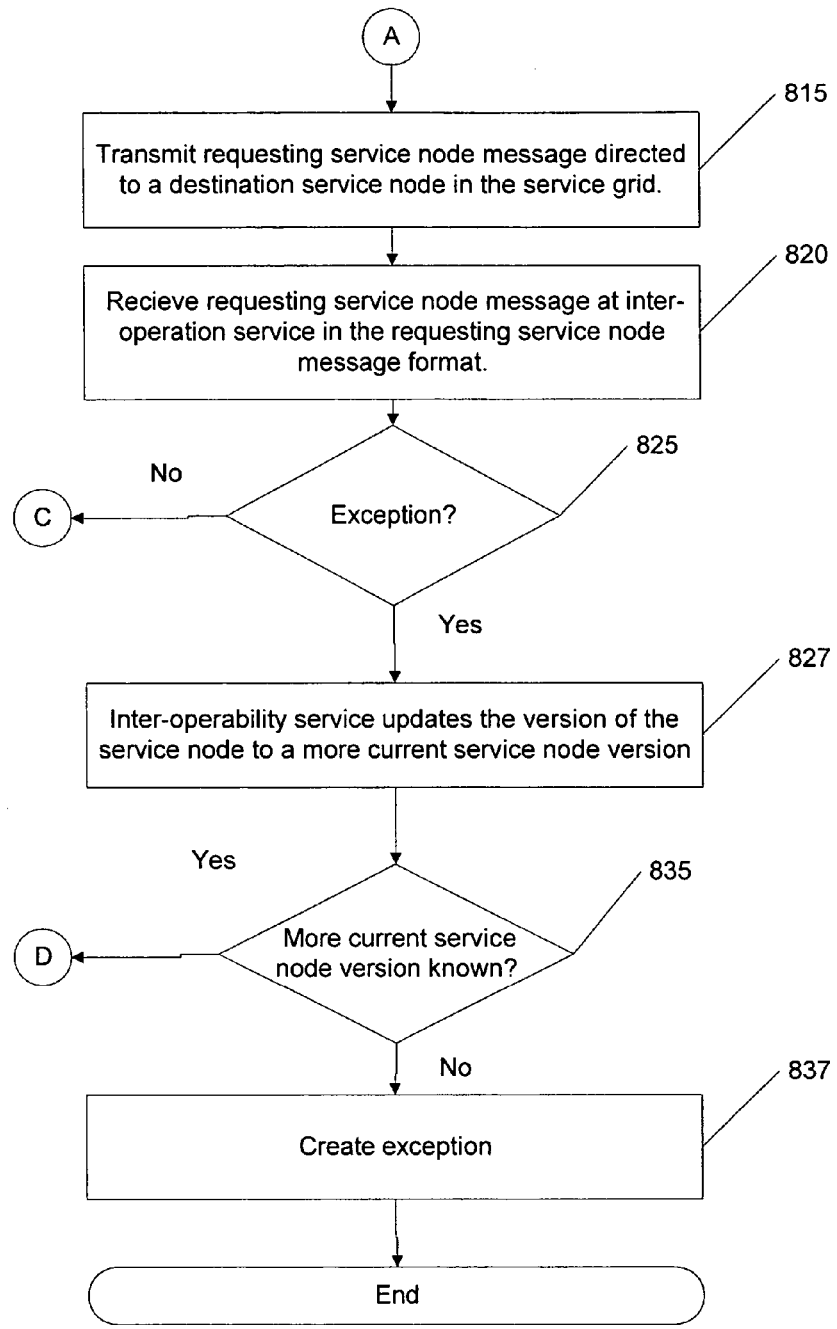
Figure 8C:
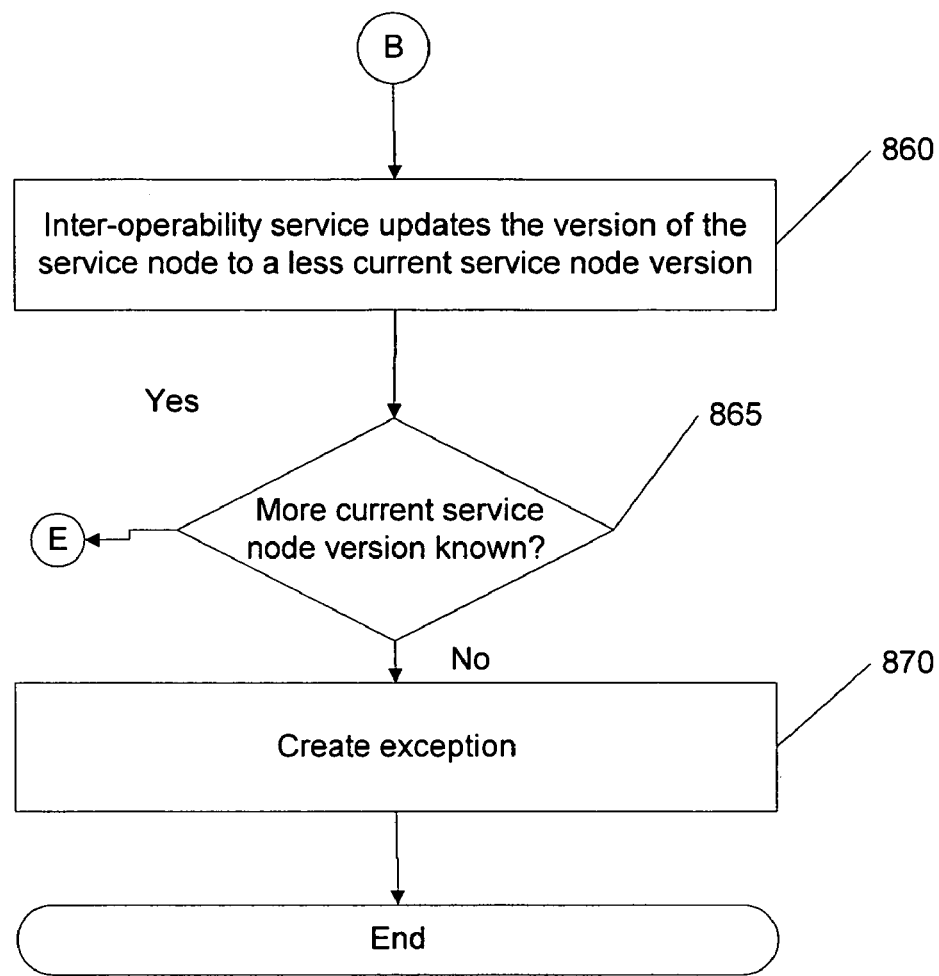

FIGS. 8A-8C are flowcharts that illustrate operations of embodiments of inter-operability services according to the invention. In particular, the flow chart in FIG. 8 illustrates dynamic update of service node versions in inter-operability services according to the invention. A requesting service node transmits a requesting service node message which is directed to a destination service node in the service grid. It will be understood that the requesting service node message is formatted according to the version of the requesting service node (Block 801). The requesting service node message is received at the inter-operability service in the requesting service node message format (Block 803).

Upon receiving the requesting service node message, the inter-operability service determines the version of the destination service node to ascertain whether the inter-operability service can convert the requesting service node message to a format that is supported by the version of the destination service node (Block 805).

If the version of the destination service node is known to the inter-operability service (Block 810), the inter-operability service determines the version of the destination service node by transmitting a command (or request) associated with the known version service node (Block 815) to which the destination service node should respond to if the version of the service node is compatible with the command (Block 820). If an exception occurs as a result of the command (Block 825), the inter-operability service updates the version of the service node determined in Block 810 to a more current service node version (Block 827). In some embodiments according to the invention, the inter-operability service updates the version of the service node to the next version. If the inter-operability service determines that the more current service node version is not known (Block 835), the inter-operability service generates an exception and the transmission of the requesting service node message fails (Block 837).

Referring again to Block 835, if the inter-operability service determines that the more current service node version is known, the inter-operability service repeats the operations described above in Blocks 815-820, whereupon the inter-operability service again checks for the generation of an exception (Block 825). The inter-operability service repeats this procedure of updating the service node version until no exception occurs to provide the service node version used to communicate with the destination service node. The inter-operability service then updates the inter-operability service table with the determined version of the destination service node (Block 830).

Referring again to Block 810, if the inter-operability service determines that the version of the destination service node is unknown, the inter-operability service sets a version of the destination service node to the most current version known (Block 840). The inter-operability service determines a command for the most current service node version (Block 845) and transmits the command to the destination service node based on the most current service node version (Block 850). If an exception occurs as a result of the command (Block 855), the inter-operability service changes the version to a version which is less recent than the current service node version used to communicate with the destination service node (Block 860). If the inter-operability service determines that the less recent version is known (Block 865), the inter-operability service determines a new command for transmission to the destination service node using the less current version as outlined above in reference to Blocks 845 and 850. If, however, the inter-operability service determines that the less current version is not known (Block 865), the transmission of the requesting service node message fails (Block 870). The inter-operability service repeats the operation disclosed above in reference to Block 845-855 until no exception occurs in response to transmission of a command to the destination service node (Block 855), whereupon the inter-operability service updates the inter-operability service table with the version associated with the command which did not cause an exception (Block 830).

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A method of communicating between service nodes in a service grid comprising:

transmitting a requesting service node message from a requesting service node in a service grid directed to a destination service node in the service grid, the requesting service node message having a requesting service node message format associated with a version of the requesting service node;

receiving the requesting service node message at an inter-operability service in the requesting service node message format; and determining a destination service node message format for the requesting service node message based on a version of the destination service node, wherein determining further comprises:

requesting the version of the destination service node from the destination service node;

receiving the version of the destination service node at the inter-operability service;

determining whether the version of the destination service node is known at the inter-operability service;

converting the requesting service node message from the requesting service node message format to the destination service node message format at the inter-operability service responsive to determining that the version of the destination service node is known at the inter-operability service;

updating the version of the destination service node to a most current version at the inter-operability service responsive to determining that the version of the destination service node is unknown at the inter-operability service;

converting the requesting service node message from the requesting service node message format to the most current version at the inter-operability service to provide the requesting service node message in the destination service node message format; and transmitting the requesting service node message from the inter-operability service to the destination service node in the destination service node message format.

2. A method according to claim 1 further comprising:

converting the requesting service node message from the requesting service node message format to the destination service node message format at the inter-operability service; and transmitting the requesting service node message from the inter-operability service to the destination service node in the destination service node message format.

3. A method according to claim 1 wherein the version of the requesting service node is newer or older than the version of the destination service node.

4. A method according to claim 1 wherein the inter-operability service comprises a web service available to the requesting service node and the destination service node.

5. A method according to claim 1 wherein the inter-operability service comprises an administrative service available to the requesting service node.

6. A method according to claim 1 wherein the requesting service node comprises an intermediate service node, the inter-operability service comprises a first inter-operability service, and the requesting service node message comprises an originating service node message, wherein transmitting a requesting service node message is preceded by:

determining that the version of the destination service node is unknown at a second inter-operability service associated with the originating service node;

determining that the version of the originating service node and the version of the destination service node are known at the first inter-operability service; and transmitting the originating service node message from the originating service node to the intermediate service node.

7. A method of communicating between service nodes in a service grid comprising:

transmitting a requesting service node message from a requesting service node in a service grid directed to a destination service node in the service grid, the requesting service node message having a requesting service node message format associated with a version of the requesting service node;

receiving the requesting service node message at an inter-operability service in the requesting service node message format;

determining a version of the destination service node; and updating the version of the destination service node at the inter-operability service based on the determined version of the destination service node wherein determining a version of the destination service node comprises:

determining whether the version of the destination service node is known by the inter-operability service;

setting the version of the destination service node to a most current version to provide a present version responsive to determining that the version of the destination service node is unknown by the inter-operability service;

transmitting a command to the destination service node using the present version;

modifying the present version of the destination service node to a less current version responsive to an exception on transmitting the command using the present version and transmitting the command using the less current version as the present version; and updating the version of the destination service node to be the present version responsive to no exception.

8. A method according to claim 7 wherein the inter-operability service comprises a web service available to the requesting service node and the destination service node.

9. A method of communicating between service nodes in a service grid comprising:

transmitting a requesting service node message from a requesting service node in a service grid directed to a destination service node in the service grid, the requesting service node message having a requesting service node message format associated with a version of the requesting service node;

receiving the requesting service node message at an inter-operability service in the requesting service node message format;

determining a version of the destination service node; and updating the version of the destination service node at the inter-operability service based on the determined version of the destination service node wherein determining a version of the destination service node comprises:

determining whether the version of the destination service node is known by the inter-operability service;

setting a present version of the destination service node to the determined version of the destination service node;

transmitting a command to the destination service node using the present version;

modifying the present version of the destination service node to a more current version responsive to an exception on transmitting the command using the present version and transmitting the command using the more current version as the present version; and updating the version of the destination service node to be the present version responsive to no exception.

10. A method according to claim 9 wherein the inter-operability service comprises a web service available to the requesting service node and the destination service node.

* * * * *